May 6, 1958 P. C. JACOBS, JR 2,833,890
FILLERLESS ONE TIME FUSES
Filed July 22, 1955 2 Sheets-Sheet 1 wire-type fuse link in asbestos sleeve wire-type fuse link in woven glass fiber sleeve multi perforated ribbon-type fuse link in woven glass fiber sleeve Inventor:
Philip C. Jacobs, Jr.
by [signature] Attorney May 6, 1958  P. C. JACOBS, JR  2,833,890
FILLERLESS ONE TIME FUSES
Filed July 22, 1955  2 Sheets—Sheet 2
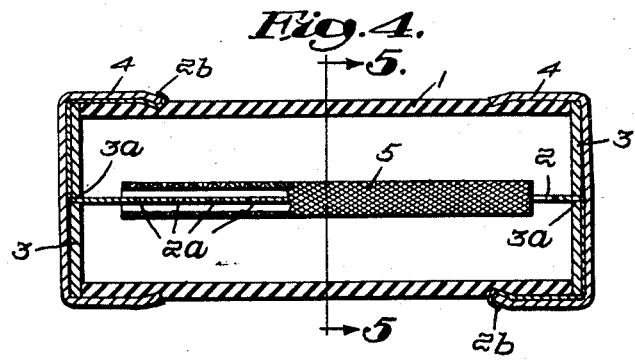
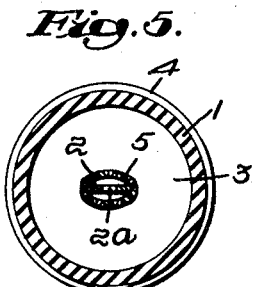
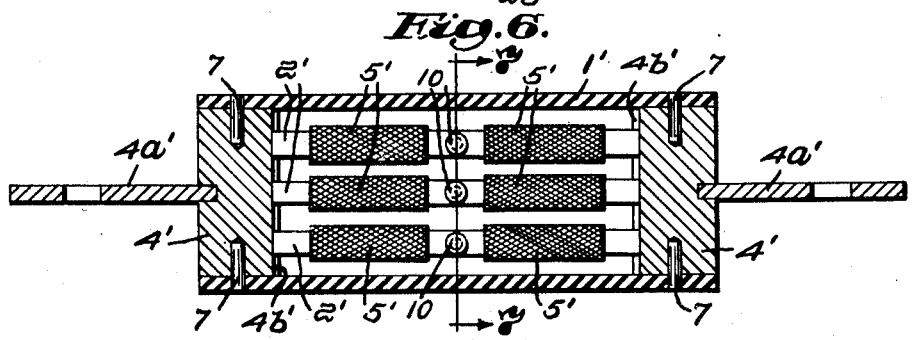
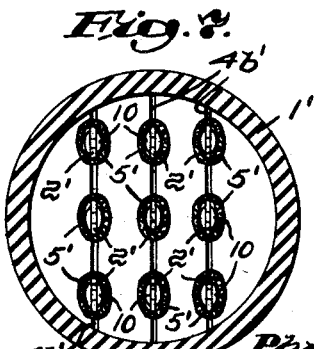
Inventor:
Philip C. Jacobs, Jr.
by Attorney United States Patent Office 2,833,890
Patented May 6, 1958

2,833,890

FILLERLESS ONE TIME FUSES

Philip C. Jacobs, Jr., Newtonville, Mass., assignor to The Chase-Shawmut Company, Newburyport, Mass.

Application July 22, 1955, Serial No. 523,670

4 Claims. (Cl. 200—131)

This invention relates to electric fuses, and more particularly to fuses adapted to be produced by mass production methods.

Electric fuses having a relatively high interrupting capacity rating require some de-ionizing means to accelerate de-ionization of the path of the arc formed incident to blowing of the fuse. The most widely applied de-ionizing means is a pulverulent arc-quenching filler such as, for instance, quartz sand. Where but relatively limited arc energy absorption is required as, for instance, in plug-type fuses, glass fibers have been used as de-ionizing means for the arc path. De-ionizing means substantially of silicon dioxide are generally particularly effective on account of their high arc energy absorbing capacity, i. e. quartz and like substances are particularly effective de-ionizers on account of their high heat of fusion. Quartz sand and glass fibers, or glass wool have, however, a serious drawback when applied in fuse structures as de-ionizing means. Small amounts of these two de-ionizing substances, or fillers, tend to get dispersed and threaten, due to their great hardness, to impair or damage any kind of machinery into which they may get in dispersed form. Wherever pulverulent arc-quenching fillers and/or glass-fibers or glass wool are being used in manufacturing fuses, machinery must be largely excluded from the manufacturing process and consequently automation becomes virtually impossible.

It is, therefore, one object of this invention to provide electric cartridge fuses having relatively effective de-ionizing means not subject to the limitations and drawbacks of the aforementioned prior art de-ionizing means.

Another object of the invention is to provide fuse structures including de-ionizing means which operate basically in the same fashion as a filler of quartz sand, which fuse structures can, however, be more readily assembled than prior art fuse structures including a quartz sand filler.

Another object of the invention is to provide fuse structures which lend themselves to mass production methods including unrestricted use of machinery and automation.

Another object of the invention is to provide improved fuse structures wherein de-ionization of the hot products of arcing is effected by woven sleeves of fibers mounted on the fuse link consisting substantially of silicon dioxide.

These and other objects and advantages of the invention will become apparent upon consideration of the following detailed description of two embodiments thereof when taken in connection with the appended drawing, in which—

Figs. 1 to 3, inclusive, illustrate diagrammatically the mode of operation of three different basic fuse structures;

Fig. 4 is a longitudinal section of a fuse constructed in accordance with this invention;

Fig. 5 is a cross-section along 5—5 of Fig. 4;

Fig. 6 is a longitudinal section of another fuse constructed in accordance with this invention, and Fig. 7 is a cross-section along 7—7 of Fig. 6.

Figure 1:
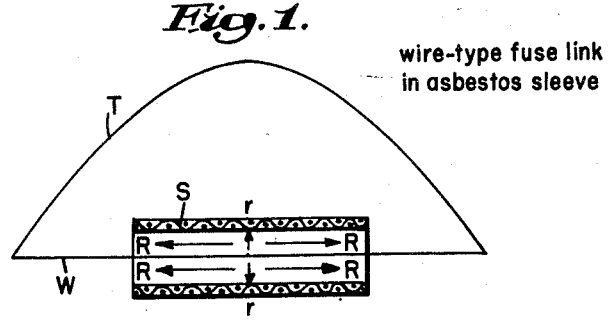

Referring now to the patent drawing, and more particularly Fig. 1 thereof, reference character W has been applied to indicate a current-carrying wire or fuse link. Mounted on wire-type fuse link W is a woven sleeve of asbestos fibers. Curve T indicates roughly the temperature distribution along wire-type fuse link W. When the peak of T exceeds the fusing point of the metal of which link W is made, link W is ruptured at the point thereof where its temperature is highest. This is true for a wide current-range extending from small overload currents slightly exceeding the minimum fusing current to a multiple of that current, say 25 times that current. At the occurrence of much higher or major fault currents multibreaks are formed along wire W in very rapid sequence. This particular phenomenon will, however, not be considered at present.

The hot products of arcing resulting from the arc kindled in the center region of wire-type link W tend to escape through the pores in the woven asbestos sleeve S, as indicated by the small arrows r, provided that the weave of sleeve S is relatively loose, i. e. the sleeve relatively porous. As a result of the intense heat to which asbestos sleeve S is subjected, the water of crystallization is driven out of the asbestos fibers and converted into steam. The steam so produced tends to reverse the initial substantially radially outward flow of arc products. The counterflow of steam results in a highly turbulent mixture of arc products and steam conducive to rapid de-ionization. Since the area of arc initiation and that of steam generation are situated close to the center of sleeve S, a zone of elevated pressure will be established close to the center of sleeve S, resulting in a pair of opposite blasts of gases indicated by large arrows R. Each of these blasts flows substantially axially along fuse link W.

It will be understood that Fig. 1 has been drawn to diagrammatically represent a given type of fuses and to explain the behavior or mode of operation thereof. A fuse of this type would also include a tubular casing of insulating material housing link W and woven sleeve S and terminal elements or ferrules arranged at the end of the casing, closing the casing and conductively connected to the ends of the fuse link. Since the casing and the terminal elements have no immediate bearing on the arrangements shown in Figs. 1 to 3, inclusive, these parts have been omitted in these diagrammatic figures.

Fuses of the general type or character shown in Fig. 1 are subject to serious limitations or drawbacks on account of which their application has been virtually discontinued. One of these limitations resides in the fact that intense prolonged pre-heating of the sleeve S by the link W may cause removal of the water of crystallization from the asbestos fibers, thus depriving them of their ability to produce arc-extinguishing blasts of steam. Another serious limitation of fuses of the general type shown in Fig. 1 consists in that at best only the center section of sleeve S is effectively used as a de-ionizing means and that the axially outer portions of sleeve S play but a relatively minor part in the arc-quenching process. This is serious since the arc extiguishing action of sleeve S is thereby almost decreased to zero.

Figure 2:
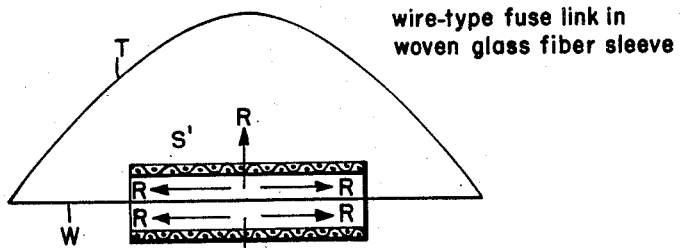

Fig. 2 shows diagrammatically a fuse link W and a sleeve S' both of which are identical to what is shown in Fig. 1, except for the fact that sleeve S' consists of woven silicon dioxide fibers, i. e. glass fibers, rather than of woven asbestos fibers.

Assuming occurrence of a fault or excess current of the same type as considered in connection with Fig. 1, fuse link W will melt at the point near its center where the temperature is highest, resulting in rupture of link W and formation of an arc at this point. The arc products are free to escape transversely through the pores in sleeve S, no back-pressure being generated by the release of steam or evolution of gases, therefrom. As a result of the substantially unimpeded passage of a stream of hot arc products transversely through sleeve S', indicated by the large arrows R, sleeve S' becomes incandescent where the arc products pass through it, providing a shunt across the arc tending to decrease or decelerate the rate of current decay in the circuit. The longer arcing lasts, the larger the amount of heat generated at the point of sleeve S' immediately adjacent the point of arc initiation, the smaller the cooling action of sleeve S' at that particular point thereof. It can be shown by means of probe measurements that the resistance of the arc gap at the point of arc initiation, decreases progressively as arcing continues. The fuse fails as a result of this decrease, unless the decrease is outbalanced by the increase of arc resistance due to arc elongation resulting from back-burning of the fuse link. In addition to the transverse venting to which reference has been made above axial venting takes place in opposite directions as indicated by arrows R. While venting blasts R tend to de-ionize the arc path, their effect does not make up for the dielectric weakness of sleeve S' immediately adjacent the point of arc initiation.

Figure 3:
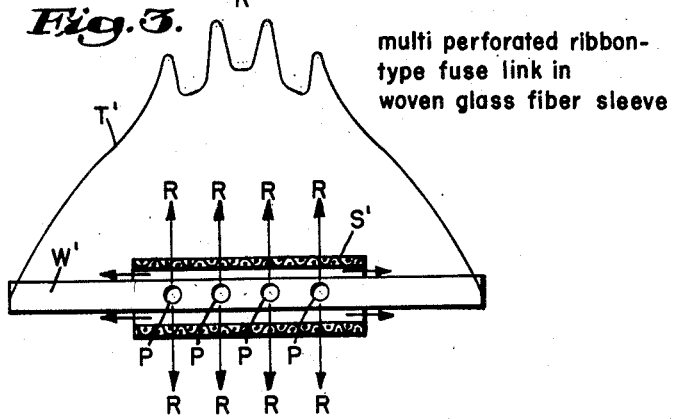

Referring now to Fig. 3, fuse link W' consists of a metal ribbon, preferably of copper, having a plurality of portions of reduced cross-sectional area formed by perforations P situated adjacent the center region of the fuse link W'. Curve T' indicates in a general way the temperature distribution along ribbon-type fuse link W'. This peculiar distribution of temperature is caused by the multiperforated geometry of fuse link W', i. e. the presence of four serially related circular perforations P therein. The sleeve S' on ribbon-type fuse link W' consists of woven quartz or glass fibers, substantially free from metallic impurities.

Assuming now occurrence of an excess current of the same character as considered in connection with Figs. 1 and 2, melting will be initiated simultaneously at the two points of fuse link W' where the temperature is highest and, if the excess current is relatively high, formation of the two initially formed breaks will be instantly followed by formation of two additional breaks each at a point of reduced cross-sectional area P of link W'. As a result, substantially the entire surface and the entire mass of the sleeve S' will at once come into action as a de-ionizing, cooling and heat absorbing means.

If the current under interruption is relatively small, the entire inner surface of sleeve S' will be covered with a pattern of spaced small glass beads, resulting from the fusion of glass fibers projecting from the surface of the sleeve toward the arc path. The spaces between these beads permit the free escape of hot arc products through the pores in sleeve S'. The escape of hot arc products takes place substantially radially along the entire length of sleeve S', as indicated by the large arrows R. The non-fused portion of sleeve S' forms an insulating support for, and a spacer between, the hot glass beads, thus precluding the arclets formed at the points of break from being shunted by hot fused quartz or glass.

If the current under interruption is relatively large, the hot products of arcing will flow substantially radially outwardly from the arcing zone along the entire length of sleeve S', as indicated by arrows R, yet in the instance of interruption of relatively high fault or excess currents the heat of the products of arcing will be sufficiently high to cause substantially simultaneous fusion of the entire perforated length of sleeve S'. This results in a rapid increase in arc voltage and in rapid current decay and the amount of current flowing in the circuit after the aforementioned substantially simultaneous fusion of the entire perforated length of sleeve S' is so small as to preclude continued arcing.

While fuses of the general type illustrated in Fig. 3, i. e. fuses wherein the conventional pulverulent filler is substituted by a woven de-ionizing sleeve tend to have a smaller interrupting capacity than comparable fuses comprising a filler of quartz sand, fuses of the type shown in Fig. 3 have an interrupting capacity which is sufficiently high, or adequate, for many applications, and their interrupting capacity is considerably higher than that of fuses of the general type illustrated in Figs. 1 and 2.

It appears from the foregoing that success depends on combining a ribbon-type fuse link having a plurality of serially related portions of reduced cross-sectional area with a loosely woven sleeve of glass fibers or silicon dioxide fibers enveloping the area of the fuse link wherein said plurality of portions of reduced cross-sectional area is located.

The arc-quenching process by a given sleeve of woven quartz or glass fibers may be compared with quenching of a fire by means of a bucket containing a predetermined volume of water. Where the entire quenching capacity inherent in that volume of water is put into action at once, right at the start of a fire to be quenched, that volume of water may amply suffice to put the fire out; but where that predetermined volume of water is gradually poured into the fire, it may not be able to control the spread thereof and to extinguish the fire. The difference in the mode of operation of the structures shown in Figs. 2 and 3 is essentially of the same nature, i. e. in both instances the sleeve S' has the same energy absorbing capacity, put successfully into action substantially at once in the case of Fig. 3, and put unsuccessfully into action in sequential doses in the case of Fig. 2.

Referring now to Figs. 4 and 5, reference numeral 1 has been applied to indicate a tubular casing of insulating material such as, for instance, hard fiber. The multi-perforated ribbon type fusible element or fuse link 2 is threaded through holes 3a in a pair of washers 3 to maintain it in coaxial position in regard to casing 1, and thus equally space it at all points from said casing. The number of perforations 2a or sections of reduced cross-sectional area of fuse link 2 depends upon the arc voltages one desires to produce. Casing 1 is closed by a pair of terminal caps 4 which are crimped to establish a firm mechanical tie with casing 1. The ends of the fusible element or fuse link 2 are twice bent 90 degrees and project out of terminal caps 4. The tips 2b of fusible element 2 are upturned into engagement with the outer surfaces of caps 4 and spot-welded to caps 4, thus providing perfect electrical contacts between fusible element 2 and caps 4. Reference numeral 5 has been applied to indicate a porous sleeve of tubularly woven glass fibers mounted on and enveloping fusible element 2. The left part of Fig. 4 shows sleeve 5 and fusible element 2 in longitudinal cross-section, exposing the perforations 2a of the latter, whereas the right part of Fig. 4 shows sleeve 5 in elevation. As clearly shown on the left side of Fig. 4 sleeve 5 envelops the area of fusible element 2 wherein the perforations or sections of restricted cross-sectional area 2a thereof are located. The length of sleeve 5 exceeds the length of the perforated portion of fusible element 2 but is less than the length of casing 1. Thus all breaks formed along fusible element 2 on the occurrence of serious fault currents are situated within sleeve 5. The space 6 bounded by the inside surface of casing 1 and the outside surface of sleeve 5 is an empty air space, i. e. any de-ionizing means in pulverulent form within casing 1 are dispensed with.

At the occurrence of serious or major fault currents a break is being formed at each section of restricted cross-sectional area or at each perforation 2a, i. e. the fuse then operates as a multibreak interrupting device. Since the fit of sleeve 5 on fusible element 2 is relatively loose, some venting of the metal vapors developed within sleeve 5 occurs in axial direction. On account of the formation of multibreaks and the porosity of sleeve 5 venting of metal vapors occurs preponderantly transversely across sleeve 5. The hot products of arcing blasting through the small pores in sleeve 2 are being effectively de-ionized and cooled. If the arc energy is relatively high the entire sleeve 5 is being heated above the fusing point of glass and fuses. The fused sleeve may be destroyed in the course of the interrupting process by mechanical action. The debris resulting from fusion and disintegration of sleeve 5 tend to be moved by gravity out of the arc path.

Sleeve 5 reduces significantly the impact of the pressure wave incident upon blowing of fuse link 2 upon casing 1, thus enabling to use casing materials having a relatively small bursting strength which are relatively inexpensive. The nature of the weave of sleeve 5 has a definite influence upon the de-ionizing action thereof. The finer the weave, the less pressure is transmitted from the arcing zone to the inner surface of casing 1. For a given set of conditions a critical range of pore sizes, or interstice sizes between the cross-weave of sleeve 5, optimally yields an optimum de-ionizing effect. As long as the weave of sleeve 5 is relatively loose, the action thereof on the rating of the fuse is relatively small. This can readily be explained on account of the fact that the pores in the sleeve permit a rapid heat exchange with the space of the casing situated outside of sleeve 5. If the weave of sleeve 5 should be tight—which is not intended—the operation thereof is similar to that of a string of glass beads aligned on a fuse link, substantially modifying the time-current characteristic of the fuse but having relatively little effect on arc extinction, particularly not on arc extinction by transverse venting of the arc path.

Referring now to Figs. 6 and 7, the fuse structure shown therein comprises a casing 1' of insulating material of which each end is closed by a cylindrical copper block 4'. Each copper block 4' is provided with a pair of blade contacts 4a' for inserting the fuse into a fuse holder or cut-out. Copper blocks 4' are attached to casing 1' by means of a plurality of angularly displaced steel pins 7. Each of the axially inner surfaces of copper blocks 4' is provided with a system of parallel grooves 4b'. Multiperforated ribbon type fuse links 2' as shown in Fig. 4 are inserted in grooves 4b' to conductively interconnect the two copper blocks 4'. The ends of fuse links 2' are preferably soldered to copper blocks 4' to minimize resistance to current flow at these joints. Porous sleeves 5' of glass fibers woven in sleeve form are mounted on the fusible elements 2' to control the emission of hot arc products from the fusible elements into casing 1'. A tin rivet 10 is secured to each fuse link 2' and arranged between the two sleeves 5' thereof. Rivets 10 initiate the interrupting process at relatively small overloads by forming an alloy with the metal—preferably copper—of which links 2 are made.

It is apparent from Figs. 6 and 7 that the fuse structure shown therein is constructed to carry relatively high currents. The interrupting capacity of this fuse structure is correspondingly high, though the conventional pulverulent filler for high interrupting capacity fuses has been completely omitted.

It will be understood that although but two embodiments of my invention have been shown and described in detail, the invention is not limited thereto. It will also be understood that the illustrated embodiments may be modified or other embodiments made without departing from the spirit or scope of the invention as set forth in the accompanying claims.

It is claimed:

1. An electric fuse comprising a current-carrying fusible element in ribbon-form, a plurality of serially related sections of restricted cross-sectional area formed in said element, a porous sleeve of tubularly woven fibers substantially of silicon dioxide directly mounted on said fusible element enveloping the area of said fusible element wherein said plurality of sections of restricted cross-sectional area is located, and the number of said sections of restricted cross-sectional area being so correlated to the arc-energy absorbing capacity of said sleeve as to enable dispensing with arc-quenching means other than said sleeve.

2. An electric fuse comprising a current-carrying fusible element formed by a multiperforated ribbon, an envelope of glass fibers woven in sleeve form directly mounted upon said element, covering the perforated area thereof, and the weave of said envelope being sufficiently loose to permit substantial venting of the products of arcing resulting from interruption of said element transversely across said envelope.

3. An electric cartridge fuse comprising a substantially tubular casing of insulating material, a pair of terminal elements each at one end of said casing closing said casing, a fuse link in ribbon form within said casing conductively interconnecting said pair of terminal elements, a plurality of serially related sections of restricted cross-sectional area formed in said fuse link, a porous sleeve of tubularly woven fibers substantially of silicon dioxide directly mounted on said fuse link enveloping the area thereof wherein said plurality of sections of restricted cross-sectional area is located, the number of said sections of restricted cross-sectional area being so correlated to the arc-energy absorbing capacity of said sleeve as to enable dispensing with arc-quenching means other than said sleeve, and the space bounded by the inside of said casing and the outside of said sleeve being an empty air space.

4. An electric cartridge fuse comprising a substantially tubular casing of insulating material, a pair of terminal elements each at one end of said casing closing said casing, a ribbon-type multiperforated fuse link of copper within said casing conductively interconnecting said pair of terminal elements, an envelope of glass fibers woven in sleeve form directly mounted on said fuse link covering the perforated area thereof, the weave of said envelope being sufficiently loose to permit substantial venting of products of arcing transversely across said envelope, and de-ionizing means in pulverulent form within said casing being dispensed with.

References Cited in the file of this patent
UNITED STATES PATENTS

| | | |
|---|---|---|
| 746,050 | Downes | Dec. 8, 1903 |
| 2,326,031 | Hodnette et al. | Aug. 3, 1943 |
| 2,532,078 | Baxter | Nov. 28, 1950 |
| 2,647,970 | Edsall et al. | Aug. 4, 1953 |
| 2,695,347 | Brautigam | Nov. 23, 1954 |

FOREIGN PATENTS

| | | |
|---|---|---|
| 961,745 | France | Nov. 28, 1949 |